United States Patent [19]

Wentworth

[11] 3,928,346

[45] Dec. 23, 1975

[54] SOLID HARDENER COMPOSITIONS

[75] Inventor: William A. Wentworth, Houston, Tex.

[73] Assignee: Napko Corporation, Houston, Tex.

[22] Filed: Oct. 29, 1974

[21] Appl. No.: 518,627

Related U.S. Application Data

[63] Continuation-in-part of Ser. No. 390,047, Aug. 22, 1973, abandoned.

[52] U.S. Cl............ 260/249.6; 260/75 T; 260/75 R
[51] Int. Cl.$^2$...................................... C07D 251/54
[58] Field of Search................................ 260/249.6

[56] References Cited
UNITED STATES PATENTS
3,806,480    4/1974    Leonard..................... 260/249.6 X Primary Examiner—John M. Ford
Attorney, Agent, or Firm—James P. Dowd

[57] ABSTRACT

Solid hardener compositions suitable for curing polyester resins are prepared by condensing carboxylic anhydrides with hexamethoxymethyl melamines.

3 Claims, No Drawings

SOLID HARDENER COMPOSITIONS

This is a continuation-in-part of application Ser. No. 390,047 filed Aug. 22, 1973, now abandoned.

BACKGROUND OF THE INVENTION

This invention relates to improved, solid hardeners, particularly suitable as cross linking agents for polyester powders. It also relates to methods of preparing solid hardeners for use in powder coatings. It is well known that powdered polyester resins can be applied to hot metal objects, either by spray, electrostatic spray or fluidized bed to produce coherent protective coatings. These coatings are brittle, lack good adhesion and are softened when exposed to elevated temperatures. Conventional coreactants such as urea or melamine resins have been used as hardeners. However, these hardeners produce extruded powders which either have very low softening points or which are so reactive that prolonged storage at elevated temperatures results in sintering. Additionally, these hardeners generally require the presence of acid catalysts. Acid catalysts are known to effect the gloss of these coatings adversely.

Melamine resins esterified solely with monobasic acids have been used. These esterified resins are expensive and difficult to process. I have discovered that glossy, flexible, stable thermoset resins can be produced using the inexpensive hardeners of this invention. The preferred ratio of hardener to polyester resin is from 5:95 to 50:50. Briefly stated the hardener of this invention is the condensation product of a carboxylic anhydride and hexamethoxymethyl melamine. The preferred anhydride is phthalic anhydride because of its low cost and ready availability.

While I do not wish to be bound by theory, it is believed that the reaction of anhydrides with hexamethoxymethyl melamine is not a direct esterification reaction. The reaction is believed to give the following product.

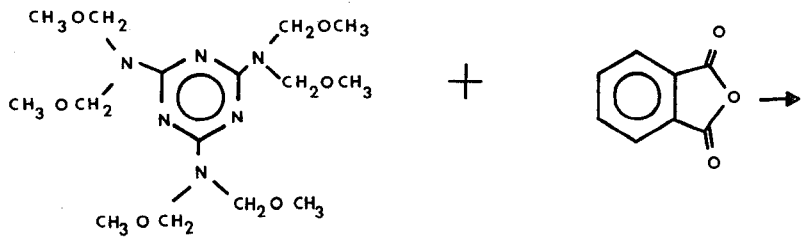

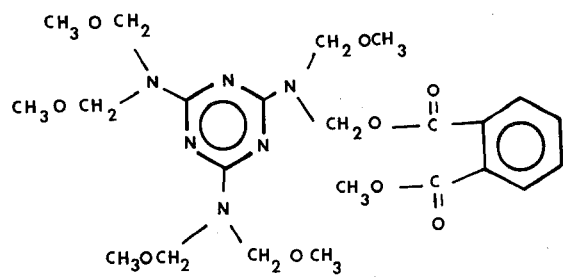

Infrared studies do not reveal the presence of acid groups in the spectrum of these products. Additionally, there is no methyl alcohol evolved when hexamethoxymethyl melamine or its esters are heated with anhydrides.

DETAILED DESCRIPTION

In carrying out my invention I proceed as follows: from 1 to 2 moles of anhydride are heated with one mole of hexamethoxymethyl melamine at 325° F for about 1½ hours at which time the product is discharged and mixed with a powdered saturated polyester resin to make a thermoset powder coating. It is generally advantageous to react part of the functional groups of hexamethoxymethyl melamine with a monofunctional acid in order to decrease the thermoset time of the powder coating. Examples of various anhydrides and combinations with monofunctional acids are given below. Any saturated polyester resin having hydroxy or acid functionality may be used with the hardeners of this invention. However, particularly desirable coatings result if the two stage polyester of example 2 is used. Other examples of this invention are illustrated in Table I.

EXAMPLE 1

Curing Agent

A 26-gallon kettle was charged with 43 pounds of hexamethoxymethyl melamine (Cymel-303) and 16.3 pounds of phthalic anhydride. The mixture was heated with agitation at a maximum temperature of 325° F for 1½ hours. 39.3 pounds of p-tert. Butylbenzoic acid was charged and a nitrogen sparge was initiated. The heating was continued and the evolved methanol collected. The final acid number is 34 to 36 and the softening point is 42° C. This product is readily granulated into a fine powder for electrostatic spray applications as the curing agent for a hydroxyl terminated polyester.

EXAMPLE 2

Two-Stage Polyester

A four liter resin kettle was charged with 1108.6 g of neopentyl glycol (10.6 mol), 878.6 g of terephthalic acid (5.3 mol) and 119.6 g of water (6.6 mol). Dibutyl tin oxide was used as a catalyst (11.7g). This mixture was heated slowly to a maximum temperature of 440° F and a final acid number of 1.8. Terephthalic acid (780.7g, 4.7 mol) and water (80.0g, 4.4 mol) was added to the above prepolymer for the second stage.

The final acid number is 16 and the softening point is 72° C.

EXAMPLE 3

Twenty parts of the hardener of Example 1 was powdered and mixed with 80 parts of the two stage polyester of example 2. The mixture was electrostatically sprayed onto a steel panel and baked at 400° F. The coating was found to be flexible and glossy. The powder was found to be stable at elevated temperature.

TABLE I

| Hexamethoxy-Methyl melamine | Anhydride | Mono-Functional | Melting Point |
|---|---|---|---|
| 1 mol | 1.05 mols phthalic anhydride | 1.95 mols p-tertiary butyl-benzoic acid | 40° C |
| 1 mol | hexahydro. phthalic anhydride 1.0 mol | 2 mols p-tertiary butylbenzoic acid | 30° C |
| 1 mol | 1 mol phthalic anhydride | — | Stable liquid. |
| 1 mol | 3 mols phthalic anhydride | — | 23° C |

I claim:

1. A method of preparing a solid hardener which comprises heating a mixture consisting of:
   a. from 25 to 75 mol percent of a carboxylic acid anhydride selected from the group consisting of phthalic anhydride and hexahydrophthalic anhydride,
   b. from 0 to 50 mol percent of a monocarboxylic, aromatic, non-heterocyclic acid,
   c. at least 25 mol percent of hexamethoxymethyl melamine.

2. The method of claim 1 wherein the solid hardener is prepared from 1 mol of phthalic anhydride and 1.95 mols of p-tertiary butyl benzoic acid.

3. The method of claim 1 wherein the monocarboxylic aromatic non-heterocyclic acid is para tertiary butylbenzoic acid.

* * * * *